(No Model.)

F. J. WERNETH.
UMBRELLA HOLDER FOR BICYCLES.

No. 472,282. Patented Apr. 5, 1892.

WITNESSES:
Otto H. Ehlers.
J. P. Davis.

INVENTOR:
Francis J. Werneth,
BY Chas. B. Mann
ATTORNEY.

UNITED STATES PATENT OFFICE.

FRANCIS J. WERNETH, OF BALTIMORE, MARYLAND.

UMBRELLA-HOLDER FOR BICYCLES.

SPECIFICATION forming part of Letters Patent No. 472,282, dated April 5, 1892.

Application filed June 11, 1891. Serial No. 395,860. (No model.)

*To all whom it may concern:*

Be it known that I, FRANCIS J. WERNETH, a citizen of the United States, residing at Baltimore city, in the State of Maryland, have invented certain new and useful Improvements in Umbrella-Holders for Bicycles, of which the following is a specification.

This invention relates to an improved umbrella-holder for bicycles, the object being to provide a device which can be readily attached to any bicycle and can be adjusted to hold an umbrella in any position.

To this end the invention consists in the novel features of construction and combinations of parts hereinafter described, and pointed out in the claim.

The invention is illustrated in the accompanying drawings, in which—

Figure 1:
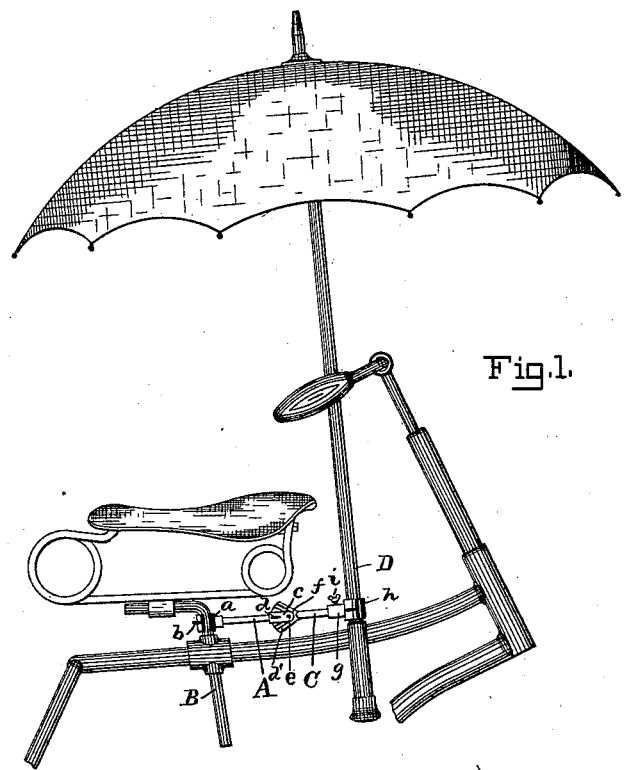
Figure 2:
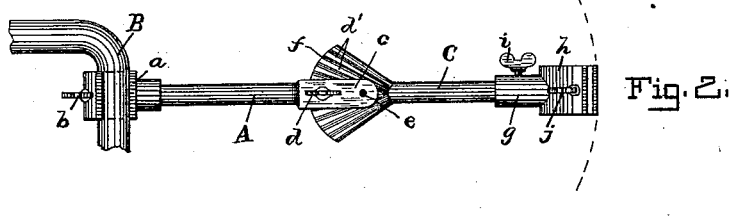
Figure 3:
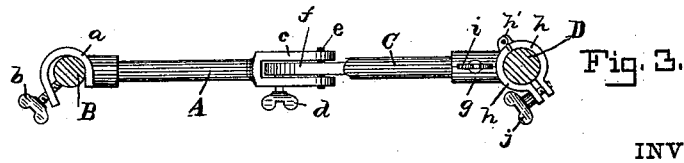

Figure 1 represents a side view of my device attached to a bicycle and holding an umbrella. Fig. 2 represents a side view of the device on an enlarged scale. Fig. 3 represents a top view showing the umbrella-stick and seat-post of the bicycle in cross-section.

The holder is here shown attached to a bicycle of the "Safety" type for male riders. It comprises a jointed rod, one member A of which has at one end a collar $a$, open at one side to admit the seat-post B of the bicycle and provided with a set-screw $b$, by which it is clamped securely to the said seat-post. This rod A has a bifurcated head $c$ at its opposite end provided with a set-screw $d$. The other member C of the rod is jointed between the members of this bifurcated head by a pivot-pin $e$, and is provided with a segment-shaped head $f$, working in said bifurcated head and provided with radial corrugations $d'$, to be engaged by the set-screw $d$ of the latter. At the opposite end of the rod C is located a clamp, which comprises two semicircular sections $h$, connected at one side by a hinge $h'$ and at the opposite side by a thumb-screw $j$. This clamp has a boss $g$, fitting loose on the rod C, so as to turn, and provided with a set-screw $i$ to fix the clamp at different adjustments. The clamp is adapted to be clasped around the umbrella-stick D and tightened on the same by the thumb-screw $j$, as shown in Fig. 3.

When attached to a bicycle of the type shown, the device is clamped to the seat-post and extends forward therefrom and carries the umbrella between the seat and handle-bar. It may, however, be clamped to the handle-bar or to the handle-bar post, and may extend forward or backward or to one side, as circumstances require. In an "upright" machine it would be clamped to the handle-bar post or to the handle-bar.

It will be observed that my construction allows the umbrella to be moved in a vertical plane on the pivot $e$ and secured at any angle by tightening the set-screw $d$ and causing it to engage in the corrugations $d'$ of the segment-head $f$. The umbrella can also be moved in a vertical plane at right angles to the plane just mentioned by turning the clamp-boss $g$ on the rod C, and can be set by the screw $i$ at the desired lateral adjustment. Thus it will be seen that I provide for a universal adjustment of the umbrella.

By the use of my apparatus a protection is afforded to the rider from wind, rain, and sun. The umbrella also assists the rider in traveling in the direction of the wind.

My device can be applied to bicycles adapted for either sex, and will carry any umbrella of ordinary construction. It will also serve to support a lamp or a package to be carried.

It will be evident that the construction may be varied without departing from the spirit of the invention.

Having thus described my invention, what I claim as new, and desire to secure by Letters Patent, is—

An umbrella-holder for bicycles, comprising a jointed rod the end of one of the sections of which is provided with an open-side collar and a set-screw and the other end is provided with a bifurcated head and a set-screw, and the other section is provided at one end with a radially-corrugated segmental head pivotally secured within the bifurcated head of the first-mentioned section, and the opposite end of the second-mentioned section is provided with a hinged clamp, which is adapted to be rotated thereon with the end of the section as an axis and to be firmly secured thereto in its adjusted positions, substantially as described.

In testimony whereof I affix my signature in the presence of two witnesses.

FRANCIS J. WERNETH.

Witnesses:
F. P. DAVIS,
FRANK DE S. BENZINGER.